(12) United States Patent
Lee et al.

(10) Patent No.: US 10,359,553 B2
(45) Date of Patent: Jul. 23, 2019

(54) METHOD FOR MANUFACTURING POLARIZER HAVING LOCALLY DEPOLARIZED AREA, AND POLARIZER, POLARIZING PLATE AND IMAGE DISPLAY DEVICE MANUFACTURED BY USING SAME

(71) Applicant: LG CHEM, LTD., Seoul (KR)

(72) Inventors: Byung Sun Lee, Daejeon (KR); Sung Hyun Nam, Daejeon (KR); Kyun Il Rah, Daejeon (KR)

(73) Assignee: LG CHEM, LTD., Seoul (KR)

( * ) Notice: Subject to any disclaimer, the term of this patent is extended or adjusted under 35 U.S.C. 154(b) by 429 days.

(21) Appl. No.: 15/100,611

(22) PCT Filed: Mar. 25, 2015

(86) PCT No.: PCT/KR2015/002937
§ 371 (c)(1),
(2) Date: May 31, 2016

(87) PCT Pub. No.: WO2015/147553
PCT Pub. Date: Oct. 1, 2015

(65) Prior Publication Data
US 2016/0299272 A1    Oct. 13, 2016

(30) Foreign Application Priority Data

Mar. 26, 2014  (KR) .................. 10-2014-0035614
Mar. 26, 2014  (KR) .................. 10-2014-0035619
Jun. 30, 2014  (KR) .................. 10-2014-0080491

(51) Int. Cl.
*G02B 5/30* (2006.01)
*B29D 11/00* (2006.01)
(Continued)

(52) U.S. Cl.
CPC ............ *G02B 5/3033* (2013.01); *B23K 26/38* (2013.01); *B23K 26/402* (2013.01);
(Continued)

(58) Field of Classification Search
CPC ... G02B 1/14; G02B 5/3033; B29D 11/00644
(Continued)

(56) References Cited

U.S. PATENT DOCUMENTS 2,445,581 A   7/1948  Land
4,181,756 A   1/1980  Fergason
(Continued)

FOREIGN PATENT DOCUMENTS

EP   1555549 A2   7/2005
EP   2426522 A1   3/2012
(Continued)

*Primary Examiner* — Ricky D Shafer
(74) *Attorney, Agent, or Firm* — Dentons US LLP

(57) ABSTRACT

The present invention relates to a method for manufacturing a polarizer including preparing a polyvinyl alcohol-based polarizer dyed with at least one of iodine and dichroic dye; forming a depolarized area by locally bringing a bleaching solution into contact with some areas of the polarizer; and acid treating at least the depolarized area using an acid solution, a polarizer and a polarizing plate manufactured by using the same.

14 Claims, 4 Drawing Sheets

(51) Int. Cl.
*G02B 1/10* (2015.01)
*G02B 1/14* (2015.01)
*B23K 26/38* (2014.01)
*B23K 26/402* (2014.01)
*B23K 103/00* (2006.01)
*B29K 29/00* (2006.01)

(52) U.S. Cl.
CPC .. *B29D 11/00644* (2013.01); *B29D 11/00865* (2013.01); *G02B 1/10* (2013.01); *G02B 1/14* (2015.01); *B23K 2103/42* (2018.08); *B23K 2103/50* (2018.08); *B29K 2029/04* (2013.01)

(58) Field of Classification Search
USPC .............................. 359/487.02, 900, 494.01
See application file for complete search history.

(56) References Cited

U.S. PATENT DOCUMENTS

| | | | |
|---|---|---|---|
| 4,396,646 A | | 8/1983 | Schuler et al. |
| 4,420,552 A | | 12/1983 | Peck et al. |
| 4,466,704 A | | 8/1984 | Schuler et al. |
| 5,327,285 A | | 7/1994 | Faris |
| 5,537,144 A | * | 7/1996 | Faris ................. G02B 27/0093 348/58 |
| 9,372,505 B2 | * | 6/2016 | Mathew ............ G02F 1/133528 |
| 2006/0048798 A1 | | 3/2006 | McCoy et al. |
| 2007/0141244 A1 | | 6/2007 | Bell et al. |
| 2008/0192345 A1 | | 8/2008 | Mochizuki et al. |
| 2008/0225210 A1 | | 9/2008 | Shimoda et al. |
| 2009/0086130 A1 | | 4/2009 | Oikawa et al. |
| 2009/0219465 A1 | * | 9/2009 | Vesely .................. G02B 27/26 349/96 |
| 2010/0245727 A1 | | 9/2010 | Shigetomi et al. |
| 2010/0314032 A1 | | 12/2010 | Kumagai et al. |
| 2011/0273646 A1 | | 11/2011 | Fukagawa et al. |
| 2012/0067506 A1 | | 3/2012 | Tan et al. |
| 2012/0106063 A1 | | 5/2012 | Mathew et al. |
| 2013/0044282 A1 | | 2/2013 | Kuwabara et al. |
| 2013/0149546 A1 | | 6/2013 | Mori et al. |
| 2013/0265708 A1 | * | 10/2013 | Mathew ............ G02F 1/133528 361/679.21 |
| 2014/0044947 A1 | | 2/2014 | Sawada et al. |
| 2014/0319436 A1 | | 10/2014 | Harada et al. |
| 2015/0131035 A1 | | 5/2015 | Chen |
| 2015/0146294 A1 | | 5/2015 | Watanabe |
| 2015/0160390 A1 | | 6/2015 | Goyal et al. |
| 2015/0316696 A1 | | 11/2015 | Kamijo et al. |
| 2016/0195653 A1 | * | 7/2016 | Lee ........................ G02B 5/305 359/486.01 |
| 2016/0195767 A1 | * | 7/2016 | Lee ........................ B29C 71/04 359/486.01 |
| 2016/0202403 A1 | | 7/2016 | Mathew et al. |
| 2016/0299271 A1 | | 10/2016 | Lee et al. |
| 2016/0299272 A1 | | 10/2016 | Lee et al. |
| 2016/0313480 A1 | * | 10/2016 | Lee ........................ B32B 27/30 |
| 2017/0045656 A1 | | 2/2017 | Ogomi et al. |
| 2017/0131448 A1 | * | 5/2017 | Lee ........................ B32B 27/30 |
| 2017/0254939 A1 | * | 9/2017 | Lee ........................... C08J 5/18 |

FOREIGN PATENT DOCUMENTS

| | | |
|---|---|---|
| EP | 2447766 A1 | 5/2012 |
| EP | 2735600 A1 | 5/2014 |
| JP | 58-062381 A | 4/1983 |
| JP | 58-065076 A | 5/1983 |
| JP | 58-168020 A | 10/1983 |
| JP | 6036563 B2 | 8/1985 |
| JP | 63-21990 A | 1/1988 |
| JP | 63-265203 A | 11/1988 |
| JP | 095519 A | 1/1997 |
| JP | 2002258051 A | 9/2002 |
| JP | 2002-350638 A | 12/2002 |
| JP | 2005-084506 A | 3/2005 |
| JP | 2005266502 A | 9/2005 |
| JP | 2006-058838 A | 3/2006 |
| JP | 2009-048179 A | 3/2009 |
| JP | 2009-098636 A | 5/2009 |
| JP | 2010-001422 A | 1/2010 |
| JP | 2011145675 A | 7/2011 |
| JP | 4789925 | 10/2011 |
| JP | 2011-257756 A | 12/2011 |
| JP | 2012-126127 A | 7/2012 |
| JP | 2012-137738 A | 7/2012 |
| JP | 2013-063666 A | 4/2013 |
| JP | 2013137551 A | 7/2013 |
| JP | 2014-037523 A | 2/2014 |
| JP | 2015-534100 A | 11/2015 |
| JP | 2015-215608 A | 12/2015 |
| JP | 2016-027135 A | 2/2016 |
| KR | 20050091904 | 9/2005 |
| KR | 10-2010-0007272 A | 1/2010 |
| KR | 20100087837 A | 8/2010 |
| KR | 10-2010-0125558 A | 12/2010 |
| KR | 20100125537 | 12/2010 |
| KR | 20100125558 | 12/2010 |
| KR | 10-2011-0115728 A | 10/2011 |
| KR | 10-2012-0046035 A | 5/2012 |
| KR | 20120046035 | 5/2012 |
| KR | 10-2013-0080869 A | 7/2013 |
| TW | 200700780 A | 1/2007 |
| TW | 201224716 A1 | 6/2012 |
| WO | 2006095815 | 9/2006 |
| WO | 2013161647 | 10/2013 |
| WO | 2014/031726 A1 | 2/2014 |
| WO | 2014123184 A1 | 8/2014 |

\* cited by examiner

[Fig. 1]
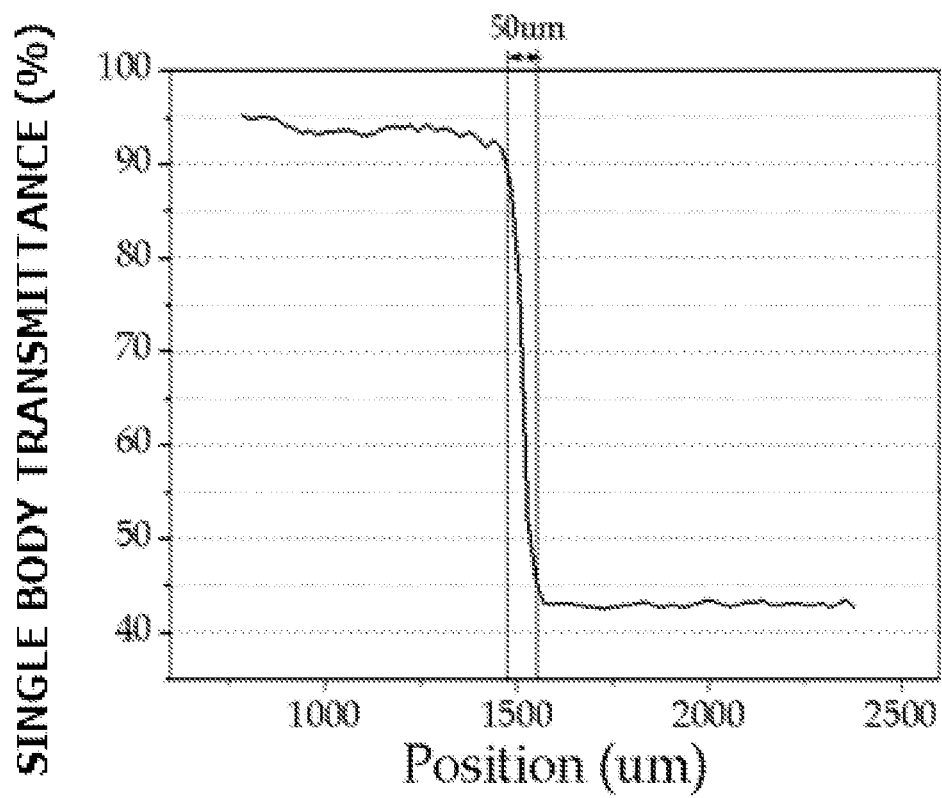

[FIG. 2]
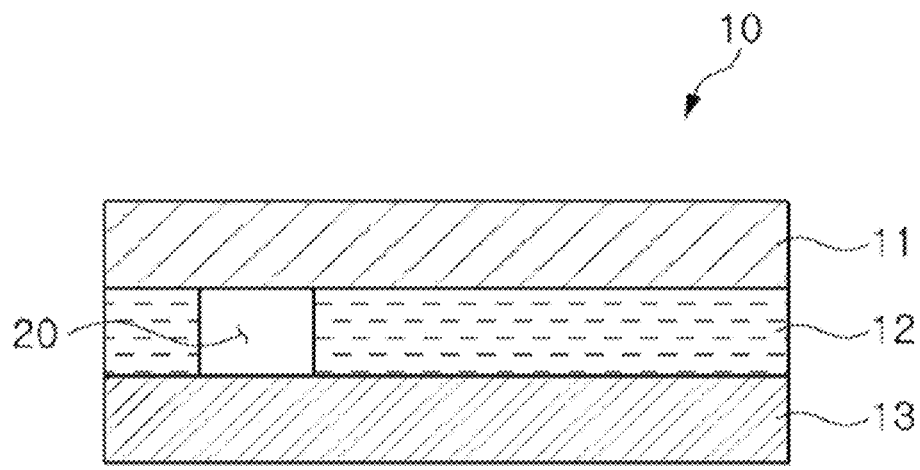

[FIG. 3]
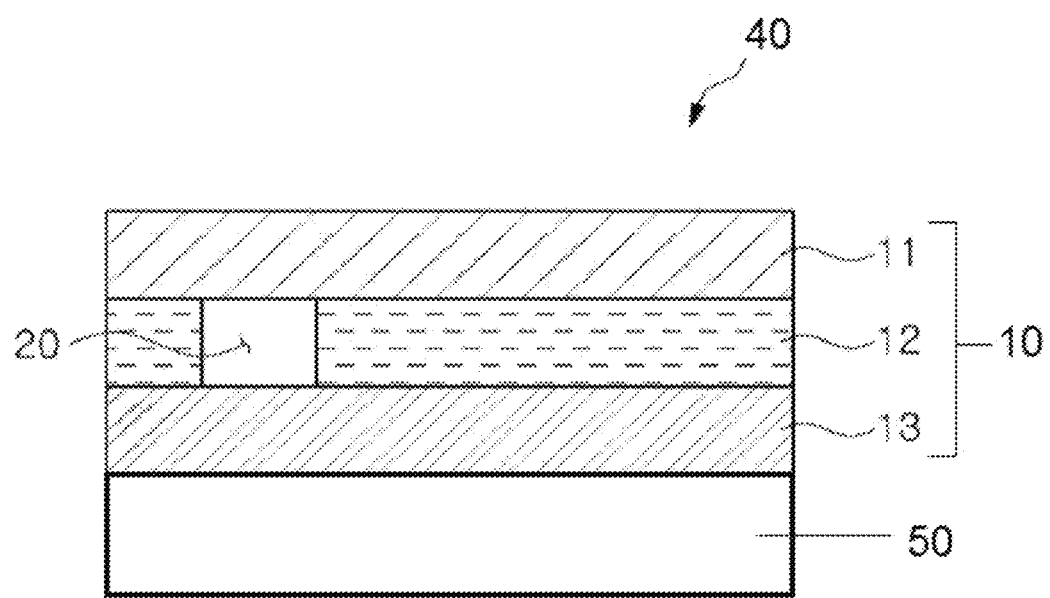

[FIG. 4]
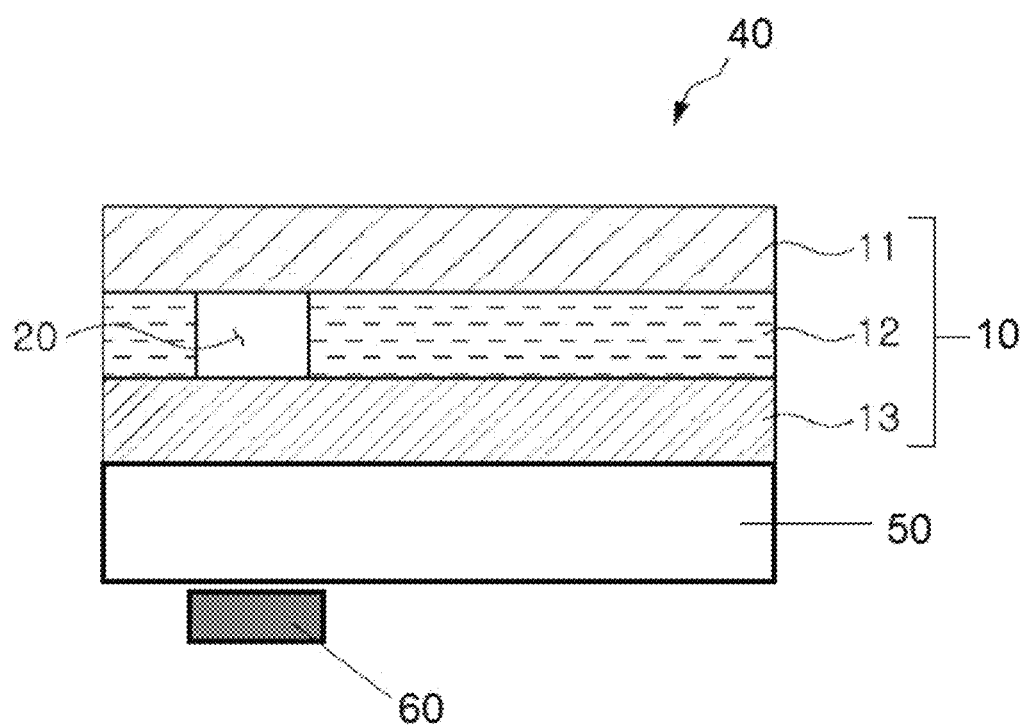

METHOD FOR MANUFACTURING POLARIZER HAVING LOCALLY DEPOLARIZED AREA, AND POLARIZER, POLARIZING PLATE AND IMAGE DISPLAY DEVICE MANUFACTURED BY USING SAME

TECHNICAL FIELD

This application is a National Stage Application of International Application No. PCT/KR2015/002937, filed Mar. 25, 2015, and claims the benefit of Korean Patent Application No. 10-2014-0080491, filed Jun. 30, 2014, Korean Patent Application No. 10-2014-0035614, filed Mar. 26, 2014, Korean Patent Application No. 10-2014-0035619, filed Mar. 26, 2014, and the contents of which are incorporated herein by reference in their entirety for all purposes as if fully set forth below.

The present disclosure relates to a method for manufacturing a polarizer, and a polarizer and a polarizing plate manufactured by using the same, and more specifically, relates to a polarizer having a locally depolarized area so as to be suited for installing components such as a camera module and developing colors, and a method for manufacturing the same.

BACKGROUND ART

Generally, in image display devices such as liquid crystal displays (LCD) or organic light emitting diodes, polarizers are disposed on both sides or one side of a panel substrate in order to provide an image that is bright and has favorable color reproducibility. A polarizer is generally prepared by dyeing a polyvinyl alcohol-based polymer film with iodine or dichroic dye, then crosslinking the result using a crosslinking agent, and orienting the result using a method such as elongation.

Meanwhile, recent display devices tend to be slimmer, and a thickness of a bezel unit, in which a screen is not displayed, and an edge thickness tend to be minimized in order to obtain a large screen. In addition, components such as a camera tend to be installed in a display device in order to exhibit various functions, and attempts to bleach or provide various colors in a product logo or an edge area have been tried considering design factors.

However, in an existing polarizing plate, the whole area of the polarizing plate is dyed with iodine and/or dichroic dye, therefore, the polarizing plate exhibits a dark black color, and as a result, various colors are difficult to be provided in an area of display devices, and particularly, when a polarizing plate is located on components such as a camera, the polarizing plate absorbs 50% or greater of the quantity of light causing a problem such as visibility decline in a camera lens.

In order to solve such a problem, a method of physically removing a polarizing plate in a site covering a camera lens by punching a hole (bore) on a portion of the polarizing plate using a method such as punching and cutting has been commercialized.

However, such a physical method degrades the appearance of an image display device, and may damage a polarizing plate due to the nature of a hole-punching process. Meanwhile, a punching site of the polarizing plate needs to be formed in an area sufficiently away from an edge in order to prevent damage such as the tearing of the polarizing plate, and as a result, a bezel unit of the image display device becomes relatively wide when such a polarizing plate is used, which leads to a problem of being out of a recent narrow bezel design trend in an image display device. In addition, when a camera module is installed on a punching unit of a polarizing plate such as above, a camera lens is exposed to the outside causing a problem of camera lens contamination and damage when used for a long period of time.

Accordingly, a method of bleaching a local area of a polarizer needs to be provided in order to solve the problems described above by forming a depolarized area of a polarizing plate without punching, and at the same time, a polarizer having high heat resistance needs to be manufactured so that transmittance does not decrease even when the depolarized area is left unattended for a long period of time under a high temperature.

DISCLOSURE

Technical Problem

The present invention relates to a polarizer in which polarization of some areas of a polarizing plate is removed, and a method for manufacturing the same, and an object of the present invention is to provide a polarizer in which polarization is capable of being removed without physically punching a hole, which is different from existing technologies, and at the same time, the area in which the polarization is removed has a high heat resistance property.

Technical Solution

One embodiment of the present invention provides a method for manufacturing a polarizer including preparing a polyvinyl alcohol-based polarizer dyed with at least one of iodine and dichroic dye; forming a depolarized area by locally bringing a bleaching solution into contact with some areas of the polarizer; and acid treating at least the depolarized area using an acid solution.

Herein, the bleaching solution preferably includes one or more types of bleaching agents selected from the group consisting of sodium hydroxide (NaOH), sodium hydrosulfide (NaSH), sodium azide ($NaN_3$), potassium hydroxide (KOH), potassium hydrosulfide (KSH) and potassium thiosulfate ($KS_2O_3$).

The bleaching solution preferably includes the bleaching agent in 1 wt % to 30 wt %, and preferably has a pH of 11 to 14.

Meanwhile, the acid solution preferably includes one or more types selected from the group consisting of formic acid, acetic acid, propionic acid, butyric acid, adipic acid, lactic acid, citric acid, fumaric acid, malic acid, hydrochloric acid, nitric acid, phosphoric acid, sulfuric acid and boric acid.

Herein, the acid solution preferably has a pH of 1 to 5.

In addition, the present invention provides a polyvinyl alcohol-based polarizer dyed with at least one of iodine and dichroic dye, the polarizer including a depolarized area locally having single body transmittance of 80% or greater and a polarization degree of 20% or less in a wavelength band of 400 nm to 800 nm; and a polarized area having single body transmittance of 45% or less and a polarization degree of 99% or greater, wherein a boundary width of the depolarized area and the polarized area is greater than or equal to 5 μm and less than or equal to 500 μm, and single body transmittance of the boundary of the depolarized area and the polarized area is greater than 45% and less than 80%.

In addition, the present invention provides a polyvinyl alcohol-based polarizer dyed with at least one of iodine and dichroic dye, the polarizer including a polarized area and a depolarized area locally having single body transmittance of 80% and greater and a polarization degree of 20% or less in a wavelength band of 400 nm to 800 nm, wherein the depolarized area has a single body transmittance change rate of 5% or less when left unattended for 100 hours at 100° C.

In addition, the polarized area preferably has single body transmittance of 40% to 45%, and a polarization degree of 99% or greater.

Herein, in the depolarized area, content of at least one of the iodine and the dichroic dye is preferably from 0.1 wt % to 0.5 wt %, and in the polarized area, content of at least one of the iodine and the dichroic dye is preferably from 1 wt % to 4 wt %.

According to another embodiment, the present invention provides a polarizing plate further provided with a polarizer protective film on at least one surface of the polarizer.

In addition, the present invention provides an image display device including a display panel; and a polarizing plate attached to one side or both sides of the display panel, wherein the polarizing plate has a depolarized area locally having single body transmittance of 80% or greater and a polarization degree or 20% or less in a wavelength band of 400 nm to 800 nm, and the depolarized area has a single body transmittance change rate of 5% or less when left unattended for 100 hours at 100° C.

In addition, in the image display device, a camera module may be located in the depolarized area.

Advantageous Effects

The present invention enables the formation of a depolarized area close to perfect transparency without damage such as holes or tearing through depolarizing the corresponding area by bringing a bleaching solution into contact with some areas of a polyvinyl alcohol-based polarizer. When the polarizer of the present invention prepared as above is used, a problem due to brightness decline does not occur even when a polarizing plate is installed on components such as a camera.

In addition, a camera lens is not exposed to the outside, which is different from a case of forming bores through existing physical methods, therefore, problems of lens damage and contamination do not occur, and a problem of an adhesive in a polarizing plate being exposed to the site of bores and a problem of visibility decline due to discoloration may also be prevented.

Furthermore, the manufacturing method of the present invention is capable of providing a polarizer having excellent heat resistance, in which transmittance of a depolarized area is maintained even when the depolarized area is left unattended for a long period of time at a high temperature, through a washing step using an acid solution after forming the depolarized area.

DESCRIPTION OF DRAWINGS

FIG. 1 is a graph measuring single body transmittance changes in each area of a polarizer manufactured by Example 1.

FIG. 2 depicts a polarizing plate according to an exemplary embodiment of the present specification.

FIG. 3 depicts an image display device according to an exemplary embodiment of the present specification.

FIG. 4 depicts an image display device in which a camera module is located in the depolarized region of a polarizing plate.

MODE FOR DISCLOSURE

Hereinafter, preferred embodiments of the present invention will be described. However, embodiments of the present invention may be modified to various other forms, and the scope of the present specification is not limited to the embodiments described below. In addition, embodiments of the present invention are provided in order to more completely describe the present invention for those having average knowledge in the art.

The inventors of the present invention have found out that, when a bleaching solution is selectively brought into contact with some areas of a polyvinyl alcohol-based polarizer dyed with at least one of iodine and dichroic dye, and then a bleaching agent is washed using an acid solution, the polarizer has a high heat resistance property such that transmittance of a locally depolarized area does not decrease again even when the polarizer is left unattended for a long period of time at a high temperature, and have completed the present invention.

A method for manufacturing a polarizer according to the present invention includes i) preparing a polyvinyl alcohol-based polarizer dyed with at least one of iodine and dichroic dye; ii) forming a depolarized area by locally bringing a bleaching solution into contact with some areas of the polarizer; and iii) acid treating at least the depolarized area using an acid solution.

Hereinafter, each step of the manufacturing method of the present invention will be described more specifically.

First, a step of i) preparing a polyvinyl alcohol-based polarizer dyed with at least one of iodine and dichroic dye may be carried out either through a method for manufacturing a polyvinyl alcohol-based polarizer well known in the art, or a method of purchasing a commercially-available polyvinyl alcohol-based polarizer. For example, while not being limited thereto, the step of preparing a polyvinyl alcohol-based polarizer may be carried out through a step of dyeing a polyvinyl alcohol-based polymer film with iodine and/or dichroic dye, a step of crosslinking the polyvinyl alcohol-based film and the dye, and a step of elongating the polyvinyl alcohol-based film.

First, the dyeing step is for dyeing iodine molecules and/or dichroic dye to a polyvinyl alcohol-based film, and the iodine molecules and/or the dichroic dye molecules allow the step to obtain polarization having a specific vibration direction by absorbing light vibrating in a polarizer elongation direction, and passing light vibrating in a vertical direction. Herein, the dyeing may be carried out by, for example, immersing the polyvinyl alcohol-based film into a treatment bath filled with an iodine solution and/or a solution containing dichroic dye.

Herein, water is generally used as the solvent used in the solution of the dyeing step, however, an organic solvent having compatibility with water may be added in a moderate amount. Meanwhile, the iodine and/or the dichroic dye may be used in 0.06 parts by weight to 0.25 parts by weight with respect to 100 parts by weight of the solvent. This is due to the fact that transmittance of the polarizer manufactured after elongation is capable of satisfying a range of 40% to 47% when the dichroic material such as iodine is included within the above-mentioned range.

Meanwhile, when iodine is used as the dichroic material, an auxiliary agent such as an iodide compound is preferably included additionally in order to improve dyeing efficiency, and the auxiliary agent may be used in a ratio of 0.3 parts by weight to 2.5 parts by weight with respect to 100 parts by weight of the solvent. Herein, the auxiliary agent such as an iodide compound is added in order to increase solubility of iodine for water since iodine has low solubility for water. Meanwhile, the mixing ratio of the iodine and the iodide compound is preferably approximately from 1:5 to 1:10 based on the weight.

Herein, specific examples of the iodide compound capable of being added in the present invention may include potassium iodide, lithium iodide, sodium iodide, zinc iodide, aluminum iodide, lead iodide, copper iodide, barium iodide, calcium iodide, tin iodide, titanium iodide, a mixture thereof, or the like, but are not limited thereto.

Meanwhile, the temperature of the treatment bath is preferably maintained at approximately 25° C. to 40° C. When the temperature of the treatment bath is low of being less than 25° C., dyeing efficiency may decrease, and when the temperature is too high of being greater than 40° C., the amount of iodine used may increase due to the increased sublimation of iodine.

Herein, the period of polyvinyl alcohol-based film immersion in the treatment bath is preferably for approximately 30 seconds to 120 seconds. When the immersion period is less than 30 seconds, uniform dyeing on polyvinyl alcohol-based film may not be achieved, and when the period is greater than 120 seconds, immersion is no longer required since dyeing is saturated.

Meanwhile, a crosslinking step is for the iodine and/or the dichroic dye being adsorbed on the polyvinyl alcohol polymer matrix, and a deposition method carried out by depositing the polyvinyl alcohol-based film in a crosslinking bath filled with an aqueous boric acid solution and the like is generally used, however, the method is not limited thereto, and a coating method or a spraying method, in which a solution including a crosslinking agent is coated or sprayed on the polyvinyl alcohol-based film, may also be used.

Herein, water is generally used as a solvent used in the solution of the crosslinking bath, however, an organic solvent having compatibility with water may be added in a moderate amount, and the crosslinking agent may be added in 0.5 parts by weight to 5.0 parts by weight with respect to 100 parts by weight of the solvent. Herein, when the crosslinking agent is included in less than 0.5 parts by weight, the strength of the polyvinyl alcohol-based film may decrease in water due to the lack of crosslinking in the polyvinyl alcohol-based film, and when included in greater than 5.0 parts by weight, the elongation property of the polyvinyl alcohol-based film may be degraded due to excess crosslink formation. In addition, specific examples of the crosslinking agent may include a boron compound such as boric acid and borax, glyoxal, glutaraldehyde and the like, and these may be used either alone or as a combination thereof.

Meanwhile, the temperature of the crosslinking bath is different depending on the amount of the crosslinking agent and the elongation percentage, and while not being limited thereto, may have a range of 45° C. to 60° C. Generally, as the amount of a crosslinking agent increases, the temperature of a crosslinking bath is adjusted to a high temperature in order to improve the mobility of a polyvinyl alcohol-based film chain, and when the amount of a crosslinking agent is small, the temperature of a crosslinking bath is adjusted to a relatively low temperature. However, in the present invention, the temperature of the crosslinking bath needs to be maintained at 45° C. or higher for improving the elongation property of the polyvinyl alcohol-based film since elongation of 5 or more times is conducted. Meanwhile, the period of the polyvinyl alcohol-based film immersion in the crosslinking bath is preferably approximately from 30 seconds to 120 seconds. It is due to the fact that uniform crosslinking on the polyvinyl alcohol-based film may not be obtained when the immersion period is less than 30 seconds, and when the period is greater than 120 seconds, immersion is no longer required since crosslinking is saturated.

Meanwhile, elongation in the elongation step is for orienting the polymer chain of the polyvinyl alcohol-based film in a certain direction, and the elongation method may be divided into a wet elongation method and a dry elongation method, and the dry elongation method may again be divided into an inter-roll elongation method, a heating roll elongation method, a compression elongation method, a tenter elongation method and the like, and the wet elongation method may again be divided into a tenter elongation method, an inter-roll elongation method and the like.

Herein, the elongation step preferably elongates the polyvinyl alcohol-based film to an elongation percentage of 4 times to 10 times. This is due to the fact that the polymer chain of a polyvinyl alcohol-based film needs to be oriented in order to provide polarizability to the polyvinyl alcohol-based film, and the orientation of the chain may not sufficiently occur at an elongation percentage of less than 4 times, and the chain of the polyvinyl alcohol-based film may be cut at an elongation percentage of greater than 10 times.

Herein, the elongation is preferably carried out at an elongation temperature of 45° C. to 60° C. The elongation temperature may be different depending on the content of a crosslinking agent, and elongation efficiency may be reduced at a temperature of less than 45° C. since the mobility of the chain of the polyvinyl alcohol-based film is reduced, and when the temperature is greater than 60° C., the strength of the polyvinyl alcohol-based film may be weakened due to the softening of the film.

Meanwhile, the elongation step may be carried out either simultaneously or separately with the dyeing step or the crosslinking step. When the elongation step is carried out simultaneously with the dyeing step, the dyeing step is preferably carried out in an iodine solution, and when carried out simultaneously with the crosslinking step, the dyeing step is preferably carried out in an aqueous boric acid solution.

Next, the present invention carries out a step of ii) forming a depolarized area by locally bringing a bleaching solution into contact with some areas of the polarizer, when the polyvinyl alcohol-based polarizer is ready through a method such as above.

Herein, meanwhile, the bleaching solution requisitely includes a bleaching agent capable of bleaching iodine and/or dichroic dye, and a solvent. The bleaching agent is not particularly limited as long as it is capable of bleaching iodine and/or dichroic dye dyed on the polarizer, however, examples thereof preferably include one or more types selected from the group consisting of sodium hydroxide (NaOH), sodium hydrosulfide (NaSH), sodium azide ($NaN_3$), potassium hydroxide (KOH), potassium hydrosulfide (KSH) and potassium thiosulfate ($KS_2O_3$).

As the solvent, water such as distilled water is preferably used. In addition, alcohol solvents may be additionally mixed thereto and used as the solvent. While not being limited thereto, methanol, ethanol, butanol, isopropyl alcohol and the like may be mixed and used as an example.

Meanwhile, the content (concentration) of the bleaching agent in the bleaching solution may be different depending on the contact period in the bleaching process, but is preferably included in approximately 1 wt % to 30 wt % and more preferably in approximately 5 wt % to 15 wt % with respect to the total weight of the bleaching solution. When the bleaching agent content is less than 1 wt %, practical application is difficult since either bleaching is not obtained or bleaching is progressed over a few tens of minutes or longer, and when the content is greater than 30 wt %, the bleaching agent is not readily diffused to the polarizer causing an economic feasibility decrease since the amount of an increase in bleaching efficiency is insignificant.

In addition, the bleaching solution preferably has a pH of approximately 11 to 14, and more preferably approximately 13 to 14. The bleaching agent of the present invention is a strong basic compound and needs to have strong basicity enough to destroy boric acid forming a crosslinking bond between polyvinyl alcohols, and bleaching may occur favorably when the pH satisfies the above-mentioned range. For example, as a solution making iodine transparent by decomposition (bleach)(iodine clock reaction), sodium thiosulfate (pH 7) is capable of generating bleach in a general aqueous iodine compound solution, however, bleaching does not occur even when making contact for a long period of time (10 hours) in an actual polarizer (PVA). In other words, this shows that the crosslinking bond of boric acid needs to be destroyed with a strong base prior to decomposing iodine.

Meanwhile, in the present invention, the step of depolarization by making contact with the bleaching solution may be carried out using a printing device and the like, and herein, the printing device may carry out, while not being limited thereto, a contactless printing method coating a bleaching agent on a target local site or in a target shape pattern using a dispenser or an inkjet, or a contact printing method such as gravure printing.

More specifically, the device preferably carries out printing using an inkjet marking method, a gravure printing method or the like considering the readiness of carrying out a continuous process. Herein, the inkjet marking method refers to a printing method carried out by dropping an ink liquid drop on a printed object (PVA polarizer) through an inkjet nozzle, and the gravure printing method refers to a printing method carried out by filling an ink in a printing roll engraved with a shape to print, leaving the ink only in the engraved part by removing the ink in the area other than the engraved part through a doctor blade and the like, and then, transferring the ink filled in the engraved part to a printed object (PVA polarizer) using a transfer roll.

Meanwhile, the bleaching solution may have viscosity of approximately 1 cP to 2000 cP and preferably approximately 5 cP to 2000 cP. When the bleaching solution viscosity satisfies the above-mentioned range, the printing process may be smoothly carried out, and the printed bleaching solution being diffused or flowing down by the movement of a polarizing element may be prevented in a continuous process line, and as a result, bleached areas may be formed in a target shape in a target area. Meanwhile, the bleaching solution viscosity may be properly changed depending on the printing device used, surface characteristics of the polarizer and the like. For example, when using a gravure printing method, the bleaching solution viscosity may be approximately from 1 cP to 2000 cP and preferably approximately from 5 cP to 200 cP, and when using an inkjet printing method, the bleaching solution viscosity may be approximately from 1 cP to 55 cP and preferably approximately from 5 cP to 20 cP.

Meanwhile, a method of additionally adding a viscosity agent may be preferably used in order to have the bleaching solution viscosity satisfy the above-mentioned range. Accordingly, the viscosity agent increases the viscosity of a bleaching solution thereby suppresses the diffusion of the solution, and helps the formation of a depolarized area having a target size in a target location. When coating a highly viscous solution on a fast moving polarizer, the relative speed difference between the polarizer and the liquid produced during coating, and the solution diffusing to an undesirable site is prevented, and floating of the coated solution is reduced while carrying out bleaching after coating and before washing, therefore, a depolarized area having a target size may be formed in a target location.

The viscosity agent is not limited as long as it has low reactivity and is capable of increasing the viscosity of a solution, however, including one or more types selected from the group consisting of, for example, a polyvinyl alcohol-based resin, a polyvinyl acetoacetate-based resin, an acetoacetyl group-modified polyvinyl alcohol-based resin, a butenediol vinyl alcohol-based, a polyacrylamide-based and a polyethylene glycol-based is more preferable.

Meanwhile, the viscosity agent may be included in approximately 0.5 wt % to 30 wt % and preferably in approximately 2.5 wt % to 15 wt % with respect to the total weight of the bleaching solution. When the viscosity agent content is greater than the above-mentioned range, viscosity excessively increases and washing is not effectively carried out, and when the viscosity agent content is too low, viscosity is low, and obtaining a bleached area having a target shape and size is difficult due to the diffusion and floating of the liquid.

In addition, the depolarized area may have various shapes and is not limited thereto, and moreover, the depolarized area may be formed in any location on the whole polarizing plate. However, for example, when the depolarized area is formed on a camera module, the area is preferably approximately from 0.01 $cm^2$ to 5 $cm^2$.

Meanwhile, mechanism of depolarization through the depolarization step of the present invention is specifically described as follows. A polyvinyl alcohol complex dyed with iodine and/or dichroic dye is known to be capable of absorbing light in a visible light range having a wavelength band of 400 nm to 800 nm. Herein, when a bleaching solution is brought into contact with the polarizer, iodine or dichroic dye absorbing light in a visible light wavelength band present in the polarizer is decomposed to bleach the polarizer and thereby enhance transmittance and lower a polarization degree. For example, the depolarized area may have single body transmittance of 80% or greater and a polarization degree of 20% or less in a wavelength band of 400 nm to 800 nm.

"Single body transmittance" in the present specification is expressed as an average value of transmittance of an absorption axis and transmittance of a transmittance axis in a polarizing plate. In addition, "single body transmittance" and "polarization degree" of the present specification are values measured using a V-7100 model manufactured by JASCO.

For example, when an aqueous solution including potassium hydroxide (KOH), a bleaching agent, is brought into contact with some areas of a polyvinyl alcohol-based polarizer dyed with iodine, the iodine is decomposed through a series of processes as in the following Chemical Formula 1 and Chemical Formula 2. Meanwhile, when going through a boric acid crosslinking process in the manufacture a polyvinyl alcohol-based polarizer dyed with iodine, potassium hydroxide directly decomposes boric acid as described in Chemical Formula 3, and a crosslinking effect obtained through hydrogen bonding between polyvinyl alcohol and boric acid is removed.

$12KOH + 6I_2 \rightarrow 2KIO_3 + 10KI + 6H_2O$ [Chemical Formula 1]

$IO_3^- + I_5^- + 6H^+ \rightarrow 3I_2 + 3H_2O \quad I_3^- \rightarrow I^- + I_2$ [Chemical Formula 2]

$B(OH)_3 + 3KOH \rightarrow K_3BO_3 + 3H_2O$ [Chemical Formula 3]

In other words, iodine and iodine ion complexes such as $I_5^-$ (620 nm), $I_3^-$ (340 nm) and $I_2$ (460 nm) absorbing light in a visible region are decomposed to produce $I^-$ (300 nm or less) or a salt, and light in a visible region mostly penetrates. As a result, a polarization function is relieved in an area of approximately 400 to 800 nm, a visible region of a polarizer, and the polarizer becomes transparent due to an overall transmittance increase. In other words, arranged iodine complexes absorbing visible light are decomposed to monomer forms that do not absorb visible light to relieve a polarization function in order to produce polarization in a polarizing plate.

When the depolarization step is complete as above, iii) at least the depolarized area of the polarizer is acid treated using an acid solution. In the acid treatment step, the residual bleaching solution is either diffused or remains on the polarizer when the residual bleaching solution is not properly acid treated, and the depolarized area may be formed in undesired sizes and shapes, and forming a fine-sized depolarized area may be difficult.

The acid treatment step may be carried out using a contactless printing method coating an acid solution on a local site or in a target shape pattern using a dispenser or an inkjet, or a contact printing method such as gravure printing. In addition, the acid treatment step may be carried out using a method of immersing the polarizer using a treatment bath including an acid solution.

More specifically, the method for manufacturing a polarizer of the present invention forms a locally depolarized area using a bleaching solution, and then acid treating the polarizer using an acid solution, and therefore, the formed iodine compounds, salts and the like are washed away by a bleaching agent as shown above, and the content of the iodine and the iodine ion complexes in the depolarized area is minimized. Accordingly, light absorption of the residual iodine and the iodine ion complexes of the depolarized area are reduced leading to an effect of making the area more transparent.

Herein, the polarizer may be washed using a solvent, alcohol and the like besides an acid solution such as above, however, a small amount of the bleaching agent may not be washed away and remain. In this case, when the formed depolarized area of the polarizer is left unattended for a long period of time at a high temperature, transmittance in the depolarized area may gradually decrease.

Specifically, basic materials are normally used as the bleaching agent, and when a small amount of such a basic bleaching agent remains, it reacts with polyvinyl alcohol when left unattended for a long period of time at a high temperature, and modification of the polyvinyl alcohol occurs as in the following Chemical Formula 4. Particularly, double bonds are produced in the polyvinyl alcohol-based film causing the appearance of a yellowish color, which may lead to a decrease in transmittance.

[Chemical Formula 4]

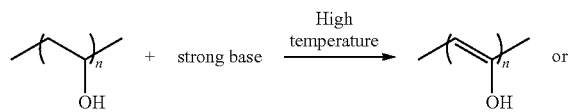

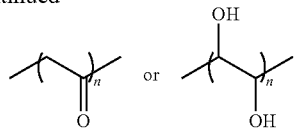

Meanwhile, when washing is carried out using an acid after forming the depolarized area as in the present invention, the residual basic bleaching agent is not only simply washed away, but is removed by a neutralization reaction with the acid solution. Accordingly, the bleaching agent remaining after the washing completely loses basicity during the washing reaction due to the neutralization reaction by the acid that remains together, and therefore, a degeneration problem due to the reaction with the polyvinyl alcohol-based film does not occur even when left unattended for a long period of time at a high temperature.

Herein, the acid solution is not particularly limited as long as it is a material releasing $H^+$ ions in a solution, and an organic acid or an inorganic acid may be used without limit. For example, while not being limited thereto, including one or more types selected from the group consisting of formic acid, acetic acid, propionic acid, butyric acid, adipic acid, lactic acid, citric acid, fumaric acid, malic acid, glutaric acid, succinic acid, hydrochloric acid, nitric acid, phosphoric acid, sulfuric acid and boric acid is preferable. In addition, the acid solution may be a solution including a crosslinking agent capable of carrying out a crosslinking reaction.

In addition, the acid solution has a pH of approximately 1 to 5 and preferably approximately 1.2 to 4.5. When the pH of the acid solution satisfies the above-mentioned range, a sufficient neutralization reaction may occur with the residual basic bleaching agent, which leads to an excellent washing effect.

Meanwhile, the washing step may be different depending on the concentration of the acid solution, but includes a method of immersing the polarizer into the acid solution for 1 second to 180 seconds and preferably for 3 seconds to 60 seconds, or a method of coating a local site bleached by being brought into contact with a bleaching solution using a dispenser or inkjet.

The method for manufacturing a polarizer of the present invention has an advantage of not necessarily including a step of washing with purified water. In a polarizer manufactured using the method for manufacturing a polarizer of the present invention, the residual acid solution does not affect sizes, transmittance and color changes of a bleached area even when the polarizer is not treated with purified water, therefore, a step of washing with purified water is not mandatory. Consequently, the method for manufacturing a polarizer of the present invention has an advantage in that process efficiency increases and process costs are reduced by not including a process of treating with purified water.

Next, a polarizer manufactured by using the method for preparing a polarizer of the present invention will be described.

The polarizer of the present specification may be manufactured by using the method for manufacturing a polarizer described above.

One embodiment of the present invention provides a polyvinyl alcohol-based polarizer dyed with at least one of iodine and dichroic dye, the polarizer including a depolarized area locally having single body transmittance of 80% or greater and a polarization degree of 20% or less in a wavelength band of 400 nm to 800 nm; and a polarized area having single body transmittance of 45% or less and a polarization degree of 99% or greater, wherein a boundary width of the depolarized area and the polarized area is greater than or equal to 5 µm and less than or equal to 500 µm, and single body transmittance of the boundary of the depolarized area and the polarized area is greater than 45% and less than 80%.

In the polarizer according to one embodiment of the present invention, the boundary width of the depolarized area and the polarized area may be greater than or equal to 5 µm and less than or equal to 200 µm, greater than or equal to 5 µm and less than or equal to 100 µm, or greater than or equal to 5 µm and less than or equal to 50 µm.

The boundary of the depolarized area and the polarized area may mean an area of the polarizer located between the depolarized area and the polarized area. The boundary of the depolarized area and the polarized area may be an area each bordering the depolarized area and the polarized area. In addition, the boundary of the depolarized area and the polarized area may be an area having a value between single body transmittance of the depolarized area and single body transmittance of the polarized area.

The boundary width of the depolarized area and the polarized area may mean the shortest distance from one area having a single body transmittance value of the depolarized area to one area having a single body transmittance value of the polarized area, and as the boundary width of the depolarized area and the polarized area is narrower, it may mean that the depolarized area is efficiently formed in a target local site.

The polarized area of the present specification may mean an area excluding the depolarized area in the polarizer.

The polarizer may be manufactured by using the manufacturing method of the present invention.

Meanwhile, more specifically, single body transmittance of the polarized area is preferably from 40% to 45%, and more preferably from 42% to 45%.

In addition, one embodiment of the present invention provides a polarizing plate further provided with a polarizer protective film on at least one surface of the polarizer.

Meanwhile, the polarizer according to one embodiment of the present invention is a polyvinyl alcohol-based polarizer dyed with at least one of iodine and dichroic dye, and the polarizer includes a polarized area and a depolarized area locally having single body transmittance of 80% and greater and a polarization degree of 20% or less in a wavelength band of 400 nm to 800 nm, wherein the depolarized area has a single body transmittance change rate of 5% or less when left unattended for 100 hours at 100° C.

The polarizer may be manufactured by using the manufacturing method of the present invention.

Herein, the depolarized area of the polarizer refers to an area formed through a process of selectively bringing a bleaching solution into contact with some areas of a polyvinyl alcohol-based polarizer dyed with iodine and/or dichroic dye, as described above.

Herein, the depolarized area formed using the manufacturing method described above preferably has single body transmittance of 80% or greater, and more preferably 90% or 92% or greater in a wavelength band of approximately 400 nm to 800 nm and preferably approximately 450 nm to 750 nm, which is a visible region. In addition, the depolarized area preferably has a polarization degree of 20% or less and more preferably 5% or less. As the depolarized area has higher single body transmittance and a lower polarization degree, visibility is enhanced, and performances and image qualities of a camera lens to be located in the area may be further enhanced.

In addition, the polarized area preferably has single body transmittance of 40% to 45% and more preferably 42% to 45%. Moreover, the polarized area preferably has a polarization degree of 99% or greater. This is due to the fact that the rest of the area excluding the depolarized area needs to exhibit excellent optical properties in the range described above by performing a primary function as a polarizer.

Meanwhile, the content of at least one of iodine and dichroic dye is approximately from 0.1 wt % to 0.5 wt % in the depolarized area, and preferably approximately from 0.1 wt % to 0.35 wt %. As shown above, this is due to the fact that the content of the iodine or dichroic dye significantly decreases since iodine that is used to be present in the form of a complex on the polarizer is washed away from a reaction between the bleaching agent and the iodine. In contrast to this, the content of at least one of iodine and dichroic dye in the polarized area is approximately from 1 wt % to 4 wt % and preferably from 2 wt % to 4 wt %.

Herein, the iodine or dichroic dye content is measured using an X-ray fluorescence spectrometer (manufactured by Regaku Corporation, trade name ⌈ZSX Primus II₁⌉). Herein, the iodine and/or dichroic dye content is measured using an X-ray fluorescence spectrometer (manufactured by Regaku Corporation, tradename ⌈ZSX Primus II₁⌉). In the present invention, an average wt % per 19.2 mm³ volume is measured using a polarizer sheet type sample having a size of 40 mm×40 mm, and a thickness of 12 µm.

As described above, the depolarized area is formed by going through a step of bringing a polarizer into contact with a bleaching solution. Herein, the content of iodine or dichroic dye of the depolarized area significantly decreases compared to other areas, and as a result, transmittance is greatly enhanced.

Meanwhile, in the polarizer according to the present invention, the depolarized area has a single body transmittance change rate of 5% or less when left unattended for 100 hours at 100° C., and the change rate is preferably 3% or less and more preferably 1% or less. Similarly, in the polarizer according to the present invention, the depolarized area has an orthogonal transmittance change rate of 10% or less when left unattended for 100 hours at 100° C.

The polarizer of the present invention has very excellent heat resistance when generally compared to a polarizer having a single body transmittance decrease of 15% or greater in the same condition when going through a washing step using water or alcohol. Besides, there are almost no changes in the polarization degree of the polarizer.

The present invention provides a polarizing plate (10) further provided with a polarizer protective film (11, 13) on at least one surface of the polarizer (12) including a depolarized area (20) as shown in FIG. 2. Specifically, the present invention provides a polarizing plate in which a polarizer protective film is laminated on one surface or both surfaces of the polarizer including a depolarized area.

In the polarizing plate of the present invention, polarization is relieved only in some areas of the polarizer, and the polarizing plate has a depolarized area having high single body transmittance and a low polarization degree, and having no physical damage in the polarizing plate unlike a physical polarization removing method such as punching and cutting.

The protective film refers to a transparent film attached to both side surfaces of a polarizer in order to protect the polarizer, and an acetate-based such as triacetyl cellulose (TAC), an acrylic-based, a polyester-based, a polyethersulfone-based, a polycarbonate-based, a polyamide-based, a polyimide-based, a polyolefin-based, an acrylic-based resin film and the like may be used, however, the protective film is not limited thereto.

Herein, the protective film may be laminated using an adhesive, and while not being limited thereto, examples of the adhesive include adhesives well known in the art such as water-based adhesives such as a polyvinyl alcohol-based adhesive, heat-curable adhesives such as an urethane-based adhesive, photocation-curable adhesives such as an epoxy-based adhesive, and photoradical-curable adhesives such as an acryl-based adhesive.

In addition, the polarizing plate may additionally include functional films such as a wide viewing angle compensation plate or a brightness enhancement film in addition to the protective film in order for additional functional improvements.

Meanwhile, as shown in FIG. 3, a polarizing plate (10) including the polarizer of the present invention such as above may be favorably used in an image display device (40) by being attached to one surface or both surfaces of a display panel (50). The display panel may include a liquid crystal panel, a plasma panel and an organic light emitting panel, and accordingly, the image display device may include a liquid crystal display (LCD), a plasma display panel (PDP) and an organic light emitting diode (OLED).

More specifically, the image display device may be a liquid crystal display including a liquid crystal panel and polarizing plates each provided on both surfaces of the liquid crystal panel, and herein, at least one of the polarizing plates may be a polarizing plate including the polarizer according to the present invention. In other words, the polarizing plate includes a polyvinyl alcohol-based polarizer dyed with iodine and/or dichroic dye locally having single body transmittance of 80% or greater in a wavelength band of 400 nm to 800 nm, and the depolarized area has a single body transmittance change rate of 5% or less when left unattended for 100 hours at 100° C.

Herein, the types of the liquid crystal panel included in the liquid crystal display device are not particularly limited. For example, known panels including panels using a passive matrix method such as a twisted nematic (TN) type, a super twisted nematic (STN) type, a ferroelectic (F) type or a polymer dispersed (PD) type; panels using an active matrix method such as a two terminal type or a three terminal type; and an in plane switching (IPS) panel and a vertical alignment (VA) type panel may all be used without being limited by the types. In addition, types of other constitutions forming a liquid crystal display device such as upper and lower substrates (ex. color filter substrate or array substrate) are not particularly limited as well, and constitutions known in the art may be employed without limit.

Meanwhile, as shown in FIG. 4, the image display device (40) of the present invention includes, while not being limited thereto, other components such as a camera module (60), and the other components such as a camera module (60) may be located in a depolarized area (20). By locating a camera module in a depolarized area in which transmittance in a visible region is enhanced and a polarization degree is relieved, an effect of enhancing visibility of the camera lens unit may be obtained.

Hereinafter, the present invention will be described in more detail with reference to examples. However, the following examples are for illustrative purposes only, and the scope of the present invention is not limited thereto.

PREPARATION EXAMPLE 1

Manufacture of Polarizer

After a polyvinyl alcohol-based film (manufactured by Nippon Synthetic Chemical industry Co., Ltd. M3000 grade 30 μm) went through a swelling process for 15 seconds in purified water at 25° C., a dyeing process was progressed for 60 seconds in an iodine solution of 0.2 wt % concentration and 25° C. After that, a washing process was carried out for 30 seconds in a boric acid solution of 1 wt % and 45° C., and then a process of 6-time elongation was progressed in a boric acid solution of 2.5 wt % and 52° C. After the elongation, a complementary coloring process was carried out in a KI solution of 5 wt %, and the result was dried for 5 minutes in an oven at 60° C. to prepare a polarizer having a thickness of 12 μm.

EXAMPLE 1

On the polarizer manufactured by the preparation example described above, a bleaching solution (bleaching agent: KOH 15%) was coated on an area of 3 $cm^2$ using a dispenser to form a depolarized area. After 35 seconds passed, the depolarized area was acid treated using acetic acid (manufactured by Daejung Chemicals & Materials Co., Ltd., 10 wt %, pH 2.4) as an acid solution, and a polarizer including a depolarized area was manufactured.

EXAMPLE 2

A polarizer including a depolarized area was manufactured in the same manner as in Example 1 except that adipic acid (manufactured by Daejung Chemicals & Materials Co., Ltd., 2.4 wt %, pH 2.8) was used as the acid solution for the washing.

EXAMPLE 3

A polarizer including a depolarized area was manufactured in the same manner as in Example 1 except that boric acid (manufactured by Dae Yang Environment & Chemical, 5.7 wt %, pH 4) was used as the acid solution for the washing.

EXAMPLE 4

A polarizer including a depolarized area was manufactured in the same manner as in Example 1 except that lactic acid (manufactured by Daejung Chemicals & Materials Co., Ltd., 10 wt %, pH 1.9) was used as the acid solution for the washing.

COMPARATIVE EXAMPLE 1

A polarizer including a depolarized area was manufactured in the same manner as in Example 1 except that the step of acid treating the depolarized area using the acid solution was not carried out.

COMPARATIVE EXAMPLE 2

A polarizer including a depolarized area was manufactured in the same manner as in Example 1 except that ethanol (manufactured by Daejung Chemicals & Materials Co., Ltd., 99%, pH 5.9) was used for the washing instead of the acid solution.

COMPARATIVE EXAMPLE 3

A polarizer including a depolarized area was manufactured in the same manner as in Example 1 except that ethanol (manufactured by Daejung Chemicals & Materials Co., Ltd., 10%, pH 6.5) was used for the washing instead of the acid solution.

TEST EXAMPLE 1

Evaluation on Heat Resistance of Polarizer

The polarizers manufactured according to Examples 1 to 4 and Comparative Examples 1 to 3 were cut into a size of 40 mm×40 mm, and each specimen was fixed on the measurement holder, and then initial optical properties of the depolarized area formed by the bleaching agent, that is, initial single body transmittance, initial orthogonal transmittance, and an initial polarization degree were measured using a UV-VIS spectrophotometer (V-7100, manufactured by JASCO). The values were 92.44%, 85.4456% and 0.1249%, respectively.

Meanwhile, after measuring the initial optical properties, each specimen was stored for 100 hours in an oven at 100° C., and single body transmittance, orthogonal transmittance, and a polarization degree were measured using the method used above, and change rates were measured compared to the initial optical properties. Herein, the optical properties of the polarizer are shown in [Table 1] as values measured at 550 nm.

TEST EXAMPLE 2

Measurement on Width of Depolarized Area and Polarized Area

Single body transmittance for each area of the polarizer manufactured in Example 1 was measured and is shown as a graph of FIG. 1.

As seen from the graph of FIG. 1, the width of the area of the polarizer manufactured in Example 1 having single body transmittance of greater than 45% and less than 90%, that is, the depolarized area and the polarized area, was 50 μm or less, and this means that the depolarized area was efficiently formed in a target area eventually.

While examples of the present invention have been described in detail above, the scope of the present invention is not limited thereto, and it will be apparent to those skilled in the art that various modifications and variations could be made without departing from the spirit of the present invention as defined by the appended claims.

The invention claimed is:

1. A method for manufacturing a polarizer comprising:
preparing a polyvinyl alcohol-based polarizer dyed with at least one of iodine and dichroic dye;
forming a depolarized area by locally bringing a bleaching solution into contact with some areas of the polarizer; and
acid treating at least the depolarized area using an acid solution,
wherein the polarizer is provided such that the depolarized area locally has single body transmittance of 80% or greater and a polarization degree of 20% or less in a wavelength band of 400 nm to 800 nm, and a

TABLE 1

| | | | Optical Properties after Being Left Unattended | | | Transmittance Change Rate | |
| --- | --- | --- | --- | --- | --- | --- | --- |
| | Washing Solution | | Single Body | Orthogonal | Polarization | Single Body | Orthogonal |
| Category | Type | pH | Transmittance | Transmittance | Degree | Transmittance | Transmittance |
| Example 1 | Acetic Acid | 2.4 | 91.84 | 84.3406 | 0.3171 | 0.649 | 1.293 |
| Example 2 | Adipic Acid | 2.8 | 92.35 | 85.2879 | 0.1939 | 0.097 | 0.185 |
| Example 3 | Boric Acid | 4 | 92.25 | 85.1017 | 0.1953 | 0.206 | 0.402 |
| Example 4 | Lactic Acid | 1.9 | 91.58 | 83.8675 | 0.1501 | 0.930 | 1.847 |
| Comparative Example 1 | No Washing Step | | 76.21 | 57.1928 | 14.8492 | 17.557 | 33.065 |
| Comparative Example 2 | Ethanol | 5.9 | 76.30 | 57.3149 | 15.0125 | 17.460 | 32.922 |
| Comparative Example 3 | Ethanol | 6.5 | 76.32 | 57.3312 | 15.0211 | 17.438 | 32.903 |

When comparing Examples 1 to 4 and Comparative Examples 1 and 3 in Table 1, it was identified that single body transmittance and orthogonal transmittance were hardly changed in the case that the depolarized area is formed by the bleaching agent and then washed using the acid solution even when left unattended for a long period of time at a high temperature, however, change rates of 15% or greater was shown when the washing step was not carried out, or the ethanol solution was used for the washing. Moreover, it was identified that the polarization degree of the depolarized area also greatly increased from 1% or less to 10% or greater.

polarized area has single body transmittance of 45% or less and a polarization degree of 99% or greater,
wherein a boundary width of the depolarized area and the polarized area is greater than or equal to 5 μm and less than or equal to 500 μm, and single body transmittance of the boundary of the depolarized area and the polarized area is greater than 45% and less than 80%.

2. The method for manufacturing a polarizer of claim 1, wherein the bleaching solution includes one or more types of bleaching agents selected from the group consisting of sodium hydroxide (NaOH), sodium hydrosulfide (NaSH), sodium azide (NaN$_3$), potassium hydroxide (KOH), potassium hydrosulfide (KSH) and potassium thiosulfate (KS$_2$O$_3$).

3. The method for manufacturing a polarizer of claim 1, wherein the bleaching solution includes a bleaching agent in 1 wt % to 30 wt %.

4. The method for manufacturing a polarizer of claim 1, wherein the bleaching solution has a pH of 11 to 14.

5. The method for manufacturing a polarizer of claim 1, wherein the acid solution includes one or more types selected from the group consisting of formic acid, acetic acid, propionic acid, butyric acid, adipic acid, lactic acid, citric acid, fumaric acid, malic acid, glutaric acid, succinic acid, hydrochloric acid, nitric acid, phosphoric acid, sulfuric acid and boric acid.

6. The method for manufacturing a polarizer of claim 1, wherein the acid solution has a pH of 1 to 5.

7. A polyvinyl alcohol-based polarizer dyed with at least one of iodine and dichroic dye, the polarizer comprising:
    a depolarized area locally having single body transmittance of 80% or greater and a polarization degree of 20% or less in a wavelength band of 400 nm to 800 nm; and
    a polarized area having single body transmittance of 45% or less and a polarization degree of 99% or greater,
    wherein a boundary width of the depolarized area and the polarized area is greater than or equal to 5 μm and less than or equal to 500 μm, and single body transmittance of the boundary of the depolarized area and the polarized area is greater than 45% and less than 80%.

8. A polarizing plate further provided with a polarizer protective film on at least one surface of the polarizer of claim 7.

9. A polyvinyl alcohol-based polarizer dyed with at least one of iodine and dichroic dye, the polarizer comprising:
    a depolarized area locally having single body transmittance of 80% and greater and a polarization degree of 20% or less in a wavelength band of 400 nm to 800 nm; and
    a polarized area,
    wherein the depolarized area has a single body transmittance change rate of 5% or less when left unattended for 100 hours at 100° C.

10. The polarizer of claim 9, wherein the polarized area has single body transmittance of 40% to 45%, and a polarization degree of 99% or greater.

11. The polarizer of claim 9, wherein, in the depolarized area, a content of at least one of the iodine and the dichroic dye is from 0.1 wt % to 0.5 wt %, and in the polarized area, a content of at least one of the iodine and the dichroic dye is from 1 wt % to 4 wt %.

12. A polarizing plate further provided with a polarizer protective film on at least one surface of the polarizer of claim 9.

13. An image display device comprising:
    a display panel; and
    a polarizing plate attached to one surface or both surfaces of the display panel,
    wherein the polarizing plate has a depolarized area locally having single body transmittance of 80% or greater and a polarization degree or 20% or less in a wavelength band of 400 nm to 800 nm, and the depolarized area has a single body transmittance change rate of 5% or less when left unattended for 100 hours at 100° C.

14. The image display device of claim 13, wherein a camera module is located in the depolarized area.

* * * * *